Patented Feb. 15, 1944

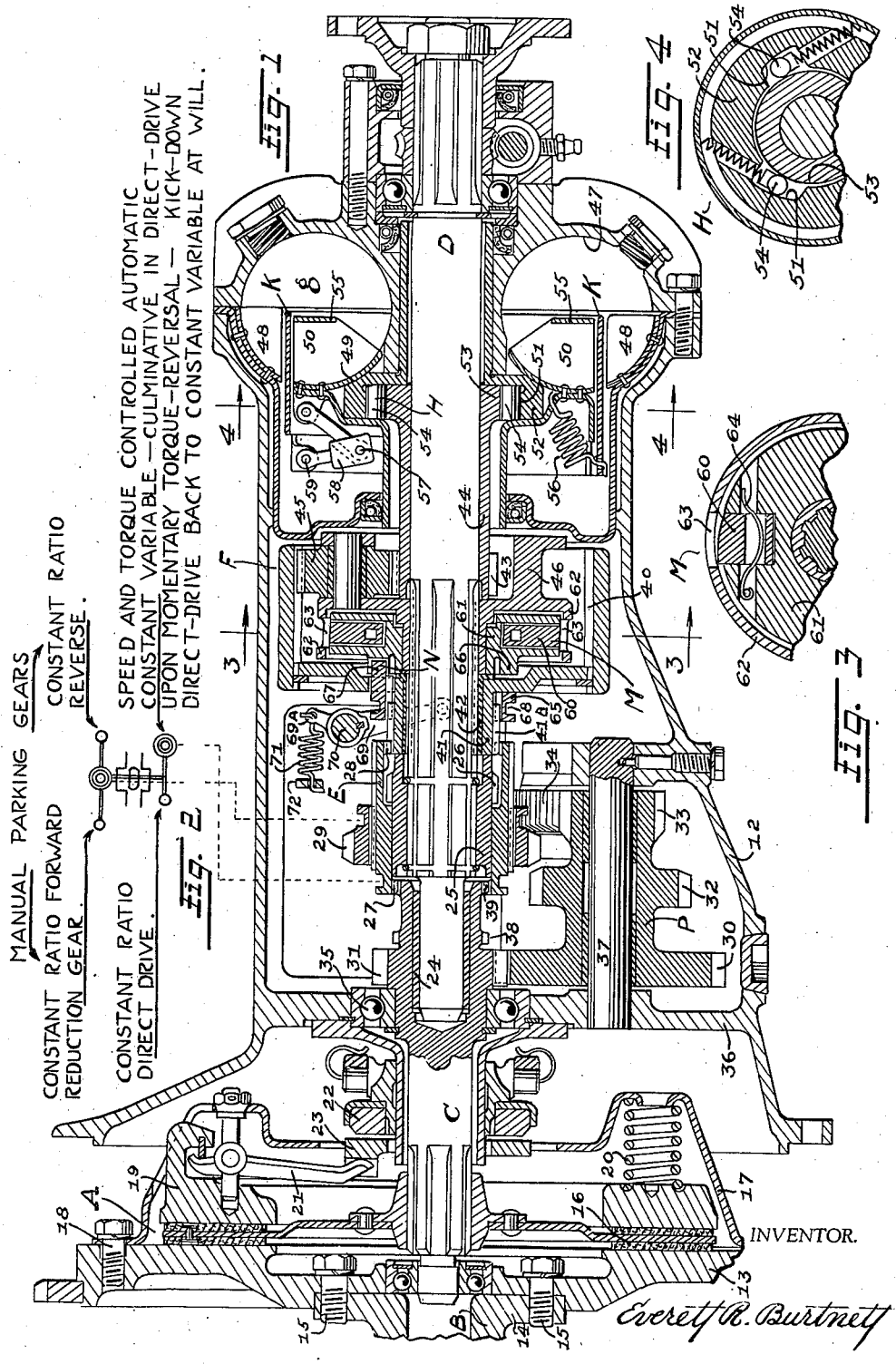

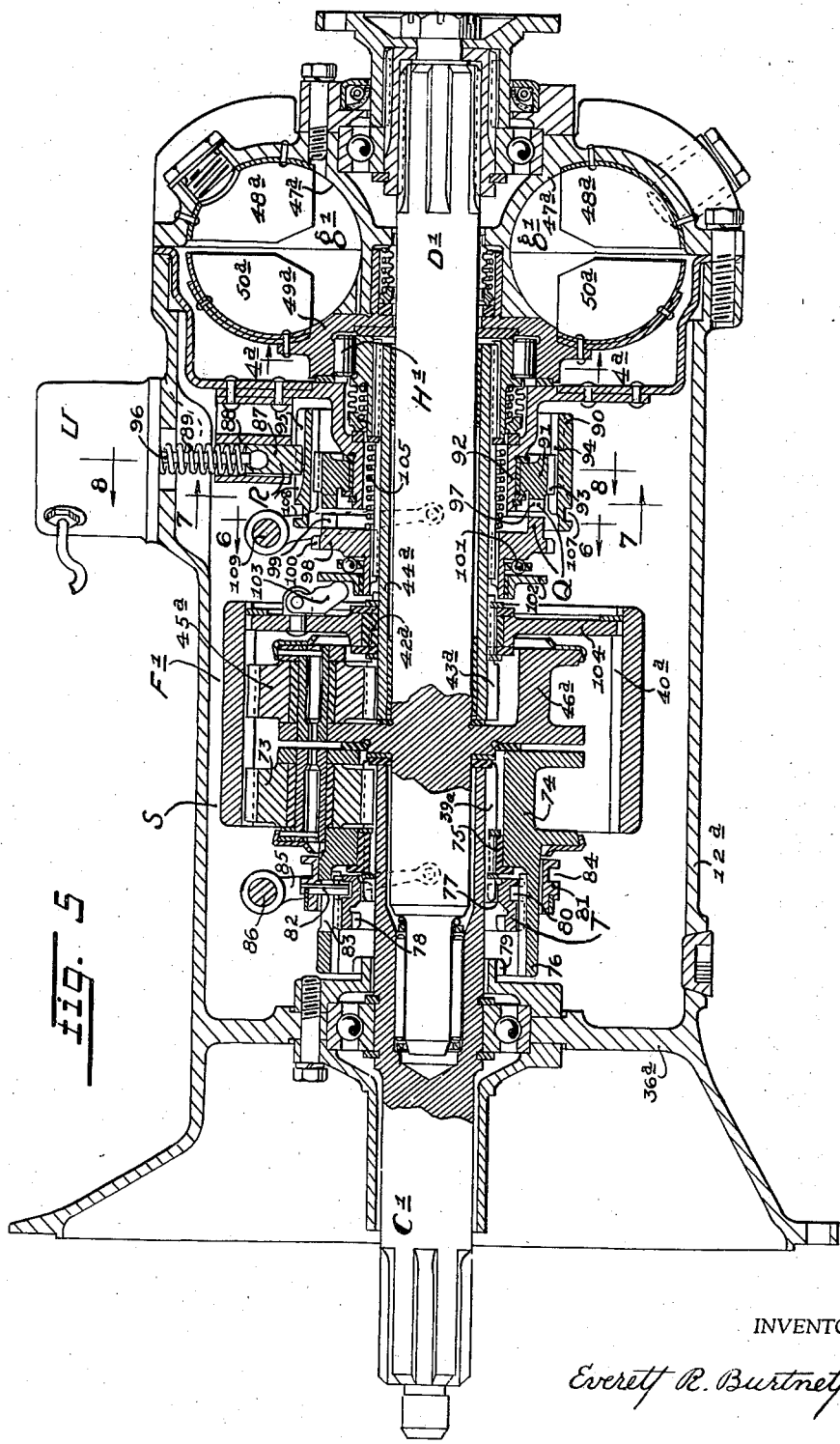

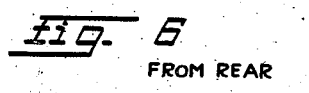
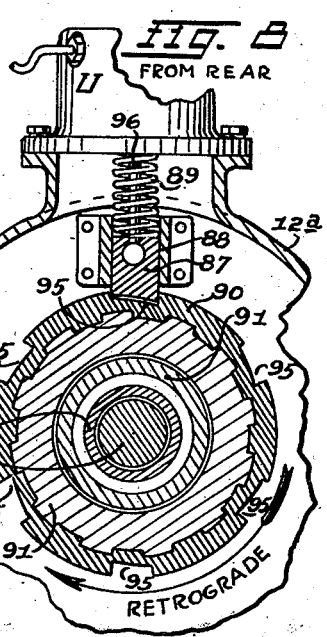
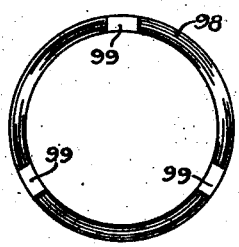
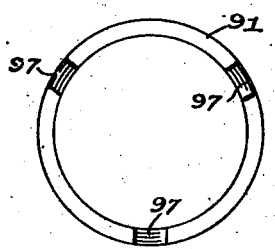
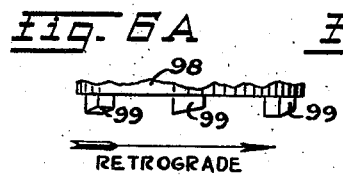
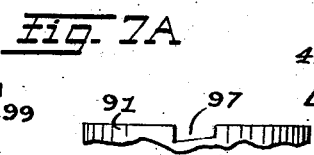
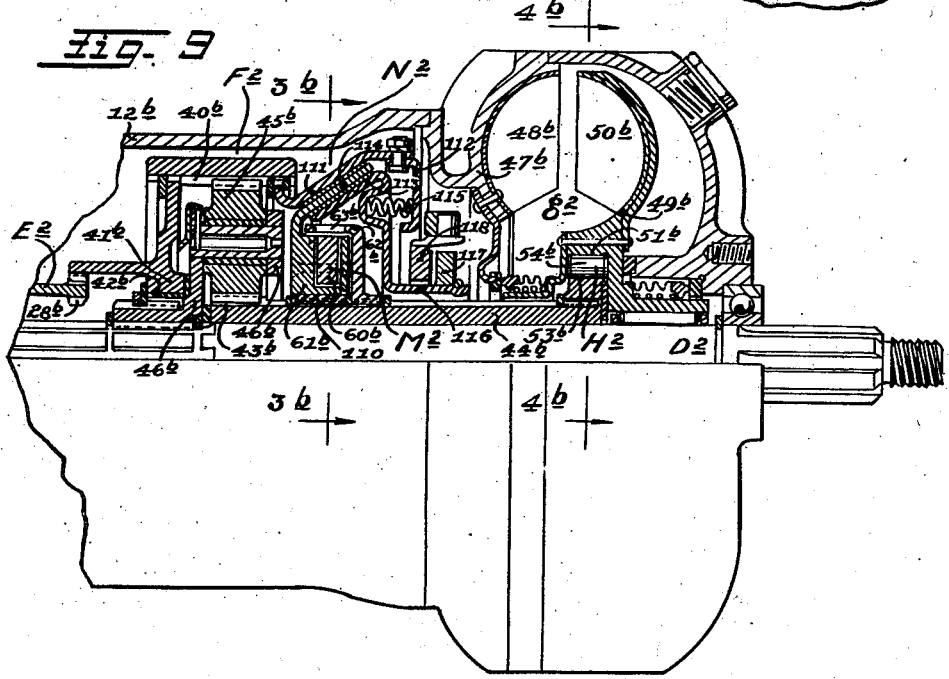

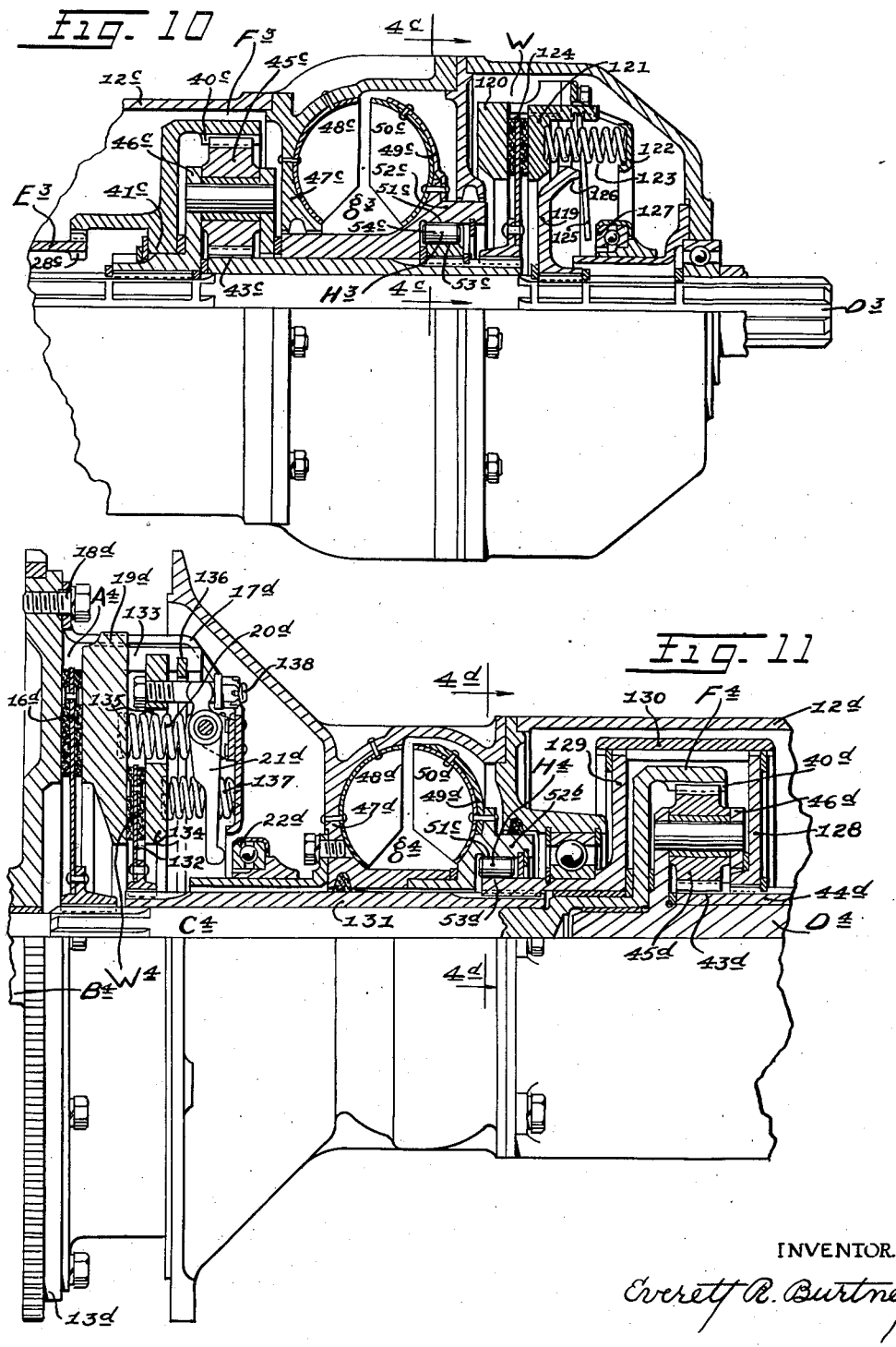

2,341,512

UNITED STATES PATENT OFFICE 2,341,512

TRANSMISSION MECHANISM AND CONTROL MEANS THEREFOR

Everett R. Burtnett, Los Angeles, Calif., assignor of one-half to Edith Glynn Burtnett, Los Angeles, Calif.

Application September 16, 1939, Serial No. 295,243

45 Claims. (Cl. 74—260)

The invention relates to power transmission and more particularly to automatic change speed mechanism.

In prior transmissions of the character above described where an automatic speed responsive device is used to establish the initial drive between the engine and the load shaft, in the first gear ratio at least to give a slipping-power-transmitting coupling obtaining in the initial drive establishing device, such a device has either been subjected to relative rotation of its drive and driven elements following the sequential abandonment of such a device from further contribution to the drive when certain succeeding faster speed ratio would establish, or has been constantly subjected to variations in the speed and influences of centrifugal force so that throughout the driving range tendency to slip would persist with resultant loss of power and heating of the clutching agents. According to the present invention these disadvantages have been overcome by providing a turbine ring type hydraulic device and the adaptation of same to establish the initial drive between the engine and the load shaft drivingly through gearing related in the drive whereby to subject the hydraulic device to only a minor ratio of the torque, together with the provision of a mechanical overrunning device in the input torque train to this hydraulic device, so that upon the subsequent establishment of a supplanting faster speed ratio of drive between the engine and the load shaft, the entire complement of this hydraulic device would be overrun permitting the operating fluid connecting agent of the device to come to a complete rest while driving in the normal range.

Another improvement of this invention resides in a combination of a normally but yieldingly engaged and optionally disengageable master clutch between the engine and a manually controlled gear set that is in first driven position from the master clutch, and in which manually controlled gear set provisions are made to selectively establish the drive through same from the engine either for a next-driven automatic variable change speed transmission unit to take the output of the manually controlled gear set and in turn drive the driven or load shaft, or for the latter to take the output of the manually controlled gear set directly with the automatic variable transmission unit established in neutral. A continuation of this improved feature of the invention lies in the drive selectivity through the manually controlled gear set between the drive and driven shafts, independent of the automatic variable speed transmission unit, including either forward or reversing reduction gear ratios each two-way positive drive and constant ratio in character, whereby in either the forward or the reversing gear drive selections that are independent of the automatic variable transmission unit the engine compression is available against the load in either direction whether at rest or in motion, as long as the master clutch is left in its normal engagement. This combination facilitates the usual optional declutching of the engine permitting the engine to be raced while the transmission is selected in any gear, including the automatic variable change speed range, and enables the release of the engine from the load at any time.

Another improvement of this invention resides in the provision of a turbine ring type hydraulic device, for its operating fluid connection in series in a reactance train to planetary gearing, to establish the initial drive through an automatic change speed range of transmission between the engine and the load shaft, and wherein such an operating fluid circuit is contained within solely a pump impeller element and a stator element, eliminating the third element that necessarily complements a so-called torque converter and in which output of the operating fluid connection is drivingly related to the load. An advantage of this provision is simplification and complete independence of the elements of the turbine ring hydraulic unit and its operating fluid content from the load shaft with respect to rotation of the latter in either direction.

Another advantage of the turbine ring type hydraulic feature of the invention, especially in its application to establish reactance to planetary gear function, and in its construction solely of two elements lies in the improved cooling obtained from the stator directly housing a greater proportion of the stream of the working circuit of the operating fluid connection.

Another object of the invention is, to provide a multiplicity of compounded independently engageable and disengageable systems of parts whose simultaneous connecting functions are required in the establishing of certain speed ratio of drive through the transmission, with certain improved engaging and disengagement effecting relations with different of this multiplicity of compoundsd independently engageable and disengageable systems of parts, in order to obtain greater flexibility of change speed control, and which improved relation of these different systems of independently engageable and disengageable parts will be described more in detail further on in the specification and in the appended claims.

The invention further consists in the several features hereinafter set forth and more particularly defined by the claims at the conclusion thereof.

For the purposes of illustration, I show the invention in one preferred general combination of transmission and control means therefor suitable for carrying the invention into effect, and several modifications of certain of the component features, and in the several drawings:

Fig. 1 is a central longitudinal section of a complete transmission embodying the above mentioned preferred form of the invention;

Fig. 2 is a diagrammatic representation of the manual selections and the resultant speeds and conditions of a transmission illustrating the preferred form of the invention as disclosed in Fig. 1;

Fig. 3 is a fragmentary view in transverse section through one of the multiple of clutches and taken on line 3—3 of Fig. 1;

Fig. 4 is a fragmentary view in transverse section through a suitable form of the overrunning device taken on line 4—4 of Fig. 1;

Fig. 5 is a central longitudinal section illustrating a modified form of the invention in which a second planetary gear unit is arranged as the forward and reverse gear selector disposed ahead of the automatic change speed transmission unit, and at variance with the wheel type gears and fixed lay shaft form of the forward and reverse gears disclosed in the manually controlled gear set as of Fig. 1, and illustrates a tandem arrangement of compounded engageable and disengageable brake parts, as compared to compounded multi-clutch units disclosed in Fig. 1;

Figs. 6 and 7 are opposite end elevational views of the positive type of engageable and disengageable features of the two elements of the brake unit taken on line 6—6 of Fig. 5;

Figs. 6A and 7A are fragmentary views in side elevation of the two positive type engageable and disengageable brake members respectively illustrated in end elevation in Figs. 6 and 7;

Fig. 8 is a fragmentary transverse view, partly in section, showing a pawl and ratchet control arrangement taken on lines 8—8 of Fig. 5, and disclosing a modified control as compared to the optionally disengageable clutch unit of the compounded multiplicity of positive type clutches associated with the planetary gearing disclosed in Fig. 1;

Figs. 9 and 10 are fragmentary vertical sectional views respectively taken through the housing of a portion of different transmission disclosures of different modified forms of the change speed planetary gearing division and its control means of a transmission carrying the invention, with the lower half of the housing in full while the upper half shows a central vertical section of the planetary gearing division of the transmission;

Fig. 11 is a fragmentary vertical sectional view taken through the housing of a portion of a transmission disclosing still another modified form of the planetary gearing division and its control means of a transmission carrying the invention, with the lower half of the housing shown in full while the upper half shows a central vertical section through this division of the transmission mechanism.

Referring to the drawings, and more particularly to Fig. 1, and in the main this illustrated form of transmission carrying the invention comprising a master clutch A coupling a drive shaft or crank shaft B to a clutch shaft or first intermediate or first driven shaft C; a driven shaft D; a clutch member E; a planetary gear unit F; a turbine ring type hydraulic unit G, whose contained working fluid to establish reactance for the planetary gear unit F; an overrunning device H, whereby the reactance train to the planetary gear unit F is divided permitting the planetary gear unit to free wheel the entire complement of the hydraulic unit G; a valve K of cylindrical form so as to singularly open and close the annular passage through which the working fluid is adapted to centrifugally move in the pump impeller element of the hydraulic unit G; compounded automatic engaging clutches M and N whose simultaneous engagements are required to establish the elements of the gearing F to rotate as a unit; and a countershaft cluster of gears P through which to obtain constant ratios of either two-way forward or reverse gear drive connecting the clutch and driven shafts C and D, as an alternative to selection of the planetary gearing F to drive the driven shaft D.

With further reference to Fig. 1, the numeral 12 designates the transmission case. The flywheel 13 secured to the drive shaft or crank shaft 14 by cap screws 15, with a driven clutch disk 16 and a clutch shell 17 secured to the flywheel 13 by cap screws 18, and a presser plate 19 energized by compression springs 20 to pack the disk 16 against the flywheel 13.

The usual clutch release fingers 21 are provided and associated with the customary clutch throw-out bearing 22 acting through the medium of a block 23 to actuate the fingers 21 for releasing the presser plate 19 from the disk 16.

A bushing 24 is pressed into a recess therefor in the clutch shaft C and receives the end of the driven shaft or load shaft D, and a first collar 25 having external clutch jaws 26 is splined or keyed rotatable with the driven shaft D. A longitudinally shiftable clutch member or second collar E is shown in a carried position on and rotatable independent of the first collar 25 and in turn carried by the driven shaft D.

A series of internal clutch jaws 27 and a second series of internal clutch jaws 28 are formed respectively in the opposite ends of the shiftable clutch member E, and a longitudinally shiftable selector gear 29 is splined to, and in carried relation on, the shiftable clutch member E.

A countershaft input gear 30 is in constant mesh with a drive pinion 31 that is rotatable with the clutch shaft C. A forward gear drive pinion 32 and a reverse drive pinion 33 complete the gear forms of the countershaft P, while a reverse idler gear 34, is in constant mesh with the reverse drive pinion 33, and is mounted parallel to the countershaft P and is adapted to be selectively engaged by the driven selector gear 29, as an alternative of the latter being selectively positioned, as shown in neutral, or engaged with the forward gear drive pinion 32.

A forward main transmission bearing 35 journals the clutch shaft C in the front wall 36 of the transmission case 12, while a spindle 37 supports the countershaft gear cluster P rotatable thereon.

A series of external clutch jaws 38 and a second series of like clutch jaws 39 are formed in longitudinally spaced relation on a driving extension of the clutch shaft C.

An internal gear element 40 of the planetary gear unit F has a hub 41 having external splines or elongated clutch jaws 41a and which hub 41 is mounted rotatable on a bushing 42 that has internal splines mated with the corresponding external splines in the periphery of the driven shaft D, so that the bushing 42 is rotatable with the shaft D.

A sun reaction gear 43 having an integral sleeve portion 44 is mounted rotatable on the driven shaft D, while a planet pinion 45 meshing with each the internal or annulus gear 40 and the sun 43 is supported rotatable on an output planet carrier 46 which is splined or keyed rotatable with the driven shaft D.

A member 47 forms a detachable rear end wall for the transmission case 12, and is preferably provided with substantially radial vanes on its inner side to serve as a continuation of the primary stator blades or vanes 48. By this construction the stationary stator element of the turbine ring type hydraulic unit G occupies more than half of the working fluid circuit and provides improvement in several important respects.

A shell 49, provided with substantially radial blades 50, is secured rotatable with the cam 51 of an annulus 52 of the one-way or overrunning device H, while the sleeve portion 44 of the sun 43 terminates drivingly in the form of a concentric hub 53 engaging the one-way wedging rollers 54 of the overrunning device H. The driven annulus 52, together with the shell 49 and the latter's vanes or blades 50 forms the pump impeller element of the turbine ring type hydraulic unit g, and which impeller element will be hereinafter defined 49. Preferably an annular inner wall 55 is included to form a mechanical boundary for the working fluid path radially and centrifugally throughout the annular passage between the segments 50 of the impeller 49.

A circumferential gap is seen to be provided between the rejecting circumference of the impeller vanes or segments 50 and the admission edge of the primary stator vanes or blades or segments 48. For longitudinal movement or coaxial movement with the axis of the annular working fluid passage of the impeller 49 and through the aforesaid gap a valve K of cylindrical form is fitted and provided with a retractive spring 56 and centrifugal weights 58 the latter toggle linked between the impeller shell 49 and a wrist pin 59 that is mounted in a forward lip of the valve K, and the links joined by a pin 57. By this arrangement the spring 56 is adapted to urge the valve K rearward to rest in the position in which it is shown until the rotative speed of the impeller K is sufficient to induce the weights 58 to overrule the spring 56 and actuate the valve K forwardly. In its closed state retracted by the spring 56 the single valve K is seen to rest in a position overlapping the inner wall 55 of the impeller 49, thereby closing the annular passage for the working fluid for the full rejecting circumference of the impeller 49.

Upon the engine being accelerated above idling to initially propel the vehicle, the accordingly increased retrograde speed of the sun gear 43 will accelerate the impeller 49 through the medium of the overrunning device H, with the result that the valve K will be centrifugally actuated by the weights 57 to uncover the annular passage for the fluid in the impeller 49 at its rejecting circumference gradually as the driving input speed to the transmission, and accordingly the retrograde speed of the sun 43 and impeller 49 are increased. This provides a simple form for preventing circulation in the hydraulic unit G while the vehicle is desired to stand at rest but established in gear, and precludes creeping tendency of the drive prior to the engine being accelerated above idling speed, when it is desired to initiate propulsion of the vehicle.

A centrifugal weight 60 forms the driving or engaging clutch element of the centrifugal or automatic speed responsive clutch M. A member 61 is mounted to rotate independently of any other train member save its carried member the engaging element 60 of the clutch M. Slots 63 are formed in the drum portion 62 of the output planet carrier 46. The slots 63 are adapted to receive the engaging clutch element 60 thereby constituting the driven or engageable clutch element or member of the automatic clutch M. In Fig. 3 a spring 64 is illustrated for urging the engaging clutch element or centrifugal weight 60 of the clutch M into a retracted or disengaged position.

A longitudinally shiftable engaging clutch member 65 of the second clutch unit N is ratchet jawed at 67 in its rearward face to engage corresponding forms 66 provided on the rotatively independently mounted member 61 that carries the engaging clutch element 60 of the first automatic clutch unit M. The engageable clutch parts 66 and their carrier member 61 thereby form the driven clutch element of the second clutch unit N. Accordingly, the two independently engageable and disengageable clutch units M and N are compounded in tandem series and their simultaneous engaged conditions are required to connect or lock the elements of the planetary gear unit F to rotate as a unit.

The shiftable engaging clutch element 65 of the second clutch unit N will be seen to have internal splines engaging the external splines 41a on the hub 41 of the internal gear 40. A groove 68 is provided in the periphery of the shiftable clutch element 65, and the bifurcated ends of a crank 69 fit into the groove 68 to actuate the clutch element 65 to and fro. The crank 69 is secured to a transverse shaft 70 that is adapted to extend into connection with means under control of the operator to actuate same. To the end that the clutch element 65 will normally be continuously urged rearwardly, tending to normally occupy an engaged position, a fulcrum end 69a is formed on the crank 69 and to which a counteracting spring 71 is fastened. Being fastened at its opposite end to a lug 72 of the transmission case, the spring 71 is normally effective to constantly energize the crank 69 to in turn urge the clutch element 65 rearwardly into an engaged position. To actuate the crank 70 in an opposite direction is to force the clutch element 65 out of an engaged position.

Preferably, the jaws 66 and 67 are formed to preclude engagement of the parts 67 with the parts 66 while the former are being rotated at a greater speed than the latter in the direction corresponding to forward drive through the transmission. This assures that the two clutch members 65 and 61 of the clutch unit N are adapted to engage only when operated in substantial synchronism.

To the end that the two clutch members 60 and 62 of the clutch unit M are also adapted to engage only when operated in substantial synchronism, the engaging clutch element 60 is suitably formed with its surface, for bearing under centrifugal force within the bore of the drum 62, cut at a tangent relative to the latter.

Operation of the transmission illustrated by Fig. 1

*Automatic change speed range.*—Assuming the parts to be in the positions in which they are shown, rotation with and at the speed of the engine will include the engaged clutch A, shaft C, engaged clutch jaws 27 and 39, clutch member E, engaged clutch jaws 28 and 41a and the internal gear 40 and clutch member 65 and engaged member 61 and the carried clutch part 60.

Assuming the driven shaft D to be at rest as under restraint of the vehicle standing at rest, this engine speed driven rotation of the internal gear 40 will reflect in rotation of the planet pinion 45, and accordingly the sun 43 will be rotated at greater speed than the internal gear 40 but relatively in a retrograde direction. This retrograde rotation of the sun 43 exerts itself through the one-way device H to the pump impeller 49, and as long as the engine is maintained rotating below a predetermined idling peak speed the springs 56 will hold the valve K in its closed position as shown, whereby the hydraulic or working fluid brake unit G will be in neutral or a no-brake rendering state.

Desiring to initiate propulsion of the vehicle, the operator will accelerate the engine with the result that the retrograde speed of the sun gear 43 and impeller 49 will be increased. Responsively the weights 58 will overcome the spring 56 and actuate the valve K in an opening movement forwardly, with the result that the fluid between the vanes or segments 50 in the annular passage of the pump impeller 49 between its outer shell and its inner wall 55 will move under centrifugal force rejecting from the impeller 49 through the gap opened by the forwardly moving valve K and into the primary vane section 48 of the stator. The reaction, provided by the stator vanes 48, to the circulation of the working fluid rejecting from the impeller vanes 50, will develop reactance against the sun gear 43 rotating retrograde freely with a factor increasing in force with increasing speed of the sun 43 and impeller 49, until the reactance factor balances the torque present in the sun 43, whereupon the slip speed of the impeller 49, relative to the stationary stator blades 48, will become constant with a constant torque factor sustained in the sun gear 43.

Hence the reactance gives an infinitely variable yielding retrograde speed-up to a balance point of the reaction and the impelling torque in the momentum of the working fluid circuit, under way in the impeller 49 and the stator blades 48.

It will be seen that the engine may be accelerated through a considerable range of speed, from that at which the valve K would start to open, and that at which it would reach its maximum opening. This enables the engine to be almost instantly accelerated from idling speed to an R. P. M. at which it would develop at least substantially its maximum torque, before the stall point in the hydraulic unit G would be reached. Having reached the stall point, under full power the vehicle would thereafter be accelerated as a constant with enablement of the engine to increase its speed accelerating the vehicle. It will be seen that the speed reduction in the planetary gear unit F will depend for driving ratio upon the degree or ratio of retrograde rotation yieldingly incurring in the hydraulic brake unit G, which is variable with the driving torque input to the planetary unit F and the reflection of same in the sun 43.

At any point of speed attainment in the vehicle acceleration, a lessening of the input power and torque to the planetary gear unit F will obtain an increasing driving speed ratio therein to the driven shaft D and the load because of the corresponding lessening of the slip ratio of the impeller 49.

When a vehicle speed is attained where torque-multiplication in the planetary gear unit F is no longer required, the operator will momentarily shut off the power to obtain a temporary reduction in the speed of the engine and the members 40, 60 and 61, relative to the member 62, until the centrifugal engaging clutch elements 60 becomes operated in substantial synchronism and comes into radial alignment with a slot 63 of the driven clutch element 62, whereupon the engaging clutch member 60 will centrifugally move into the slot 63. The result being the interlocking of the member 41 and the driven shaft D and incidentally the connection of the elements of the planetary gear unit F to rotate as a unit.

Hence upon a temporary reduction in the speed of the drive shaft B, or in the speed of the member 41 relative to the shaft D, the clutch M will establish direct drive.

By virtue of the overrunning device H in series in the reactance train between the impeller 49 and the sun gear 43, the hydraulic unit G whose working fluid is adapted to establish the reactance, is completely overrun and accordingly adapted to come to rest during direct drive.

Optional kick-down direct drive

At any time following establishment of direct drive, the operator may cause the crank 69 to be actuated so as to force the clutch member 65 out of its normally engaged position with the member 61. This reopens the planetary gear unit F for gear function over an engaged condition of the clutch M, thus providing a kick-down direct drive retrieving the under-gear drive.

Automatic reestablishment of direct drive from abnormally established under-gear drive To reestablish direct drive from a kicked-down disestablishment of same, the operator will repeat the operation of temporarily shutting off the power, whereupon the members 65 and 61 will reach substantial synchronism, as a result of the temporary reduction in the speed of the engine or drive shaft 14 or driving clutch member 65 relative to the driven clutch member 61 of the clutch unit N and the driven shaft D, and the member 65 will be automatically actuated into engaged position with the clutch member 61 under the influence of the spring 71.

Selective constant ratio positive forward under-gear

At any time a positive forward under-gear ratio is desired which will maintain a constant ratio until optionally disestablished, the operator may release the master clutch A and shift the clutch member E, from the position in which it is shown, forwardly until the jaws 27 are in neutral with respect to jaws 38 and 39 and the jaws 28 are taken out of engagement with the jaws 41a and engaged with the jaws 26, and thereupon shift the selector gear 29 into mesh with the gear 32. In this manner the drive becomes positively connected from the crank shaft 14 through the clutch A to the shaft C, to the gear 31, to the gear 30, through the countershaft P to the gear 32, to the gear 29, and through the members E and 25 to the driven shaft D.

*Selective constant ratio positive reverse gear*

To establish the transmission in reverse, the clutch member E will be positioned in neutral with respect to the clutch jaws 38, 39 and 41a and engaged with respect to the jaws 28 with 26, and thereupon the selector gear 29 will be shifted rearwardly into mesh with the reverse idler gear 34. This establishes the crank shaft 14 in positive connection through the master clutch A, to the shaft C, to the gear 31, to the gear 30, through the countershaft P to the gear 33, to the reversing gear 34, to the driven gear 29 and thence through the members E and 25 to the driven shaft D.

*Selective constant ratio direct drive*

This may be accomplished by positioning the gear 29 in neutral with respect to gears 32 and 34, and by positioning the clutch member E in its extreme forward position so that its clutch jaws 27 engage the jaws 38 while its jaws 28 engage the jaws 26. The drive from the crank shaft 14 is now via the master clutch A, shaft C, engaged jaws 27 and 38, the member E, and the connection of the latter rotatable with the driven shaft D by the engaging jaws 28 with 26.

*In neutral*

This may be accomplished by positioning the gear 29 in neutral with respect to either of the gears 32 and 34, and by positioning the clutch member E so that its jaws 27 engage neither the jaws 38 or 39, and its jaws 28 engaging neither the jaws 41a or the jaws 26.

*The transmission as illustrated in Fig. 5*

This is a modified form of transmission mechanism carrying the automatic variable ratio combination of the invention, with an auxiliary planetary gear train S provided to give the reversing gear and wherein to alternately select the automatic change speed range operative, in the stead of the wheel type manually controlled gear set illustrated in Fig. 1.

The planetary gear unit F1 for gear reduction in the automatic change speed range, and the turbine ring type hydraulic unit g1 whose working fluid or operating fluid connection to establish the reactance for gear function in the gear unit F1, and the overrunning device H1, are substantially identical with those components disclosed in Fig. 1. An exception being the omission of the valve K illustrated in Fig. 1 to control the circulation of the working fluid of the hydraulic unit G.

In this modified form of transmission, carrying the aforesaid certain improved features of the invention, the compounded independent clutching units M and N, as illustrated in Fig. 1, are substituted by compounded independently engageable and disengageable brake or reactance establishing units Q and R, and whose simultaneous brake acting engagements are required to automatically establish the forward speeds planetary gear unit F1 in positive and constant ratio gear drive supplantively over the infinitely variable ratio gear drive as would ensue from solely the hydraulic unit G and one-way device H1 providing the reactance or brake function to the sun gear 43a.

In other words, in this modified construction, the automatic step-up in driving speed ratio amounts to establishing the planetary gear unit F1 in positive gear, as compared to overrunning gear obtaining reactance slip in the unit G1.

A collar 91 is mounted for free rotation. A longitudinally shiftable collar 90 is internally splined as indicated at 94 to external splines 93 of the collar 91. The shiftable collar or selective brake member 90 has ratchet serving indentations 95 in its periphery, and one of which ratchet indentations at a time is adapted to receive a pawl 87 that is mounted reciprocal in a boxing 88, which latter in turn is secured to the transmission case 12a. While a spring 89 operates to constantly urge the pawl 87 into an engaged position in the ratchet collar 91, and an electro-magnet U is provided for withdrawing the pawl 87 from an engaged relation with the ratchet collar 90. In this manner the latter is adapted to be normally locked to the transmission case 12a, and is adapted to be released to overrun at will by supplying the current to the magnet U. The reachet collar 90 is adapted to be automatically reengaged by the pawl 87, under the influence of the spring 89, upon the pawl and ratchet elements 87 and 90 being operated in substantial synchronism.

Augmenting the pawl and ratchet elements 90 and 87 of the independently engageable and disengageable positive brake unit R, is the second independently engageable and disengageable positive brake unit Q, whose longitudinally shiftable member 98 is splined rotatable with the sleeve extension 44a of the sun gear 43a and which member 98 has axially engageable jaws 99 for engagement with corrosponding jaws 97 formed on the intermediary collar 91. A spring 105 tends to normally constantly urge the member 98 out of an engaged position with the member 91, while a centrifugal weight 103, operating through an anti-friction thrust bearing 101, is adapted to actuate the member 98 into an engaged position with the member 91, when the carrier embodiment 40a and 104 has sufficient speed of rotation for the weight 103 to have a centrifugal coefficient capable of actuating the member 98 into its said engaged position, and when the members 98 and 91 are operated in substantial synchronism permitting said engagement.

To the end, that the brake connections through the compounded units Q and R may be selectively established giving a permanent and positive brake action, clutch teeth 100, corresponding to the splines 94 of the optionally shiftable sleeve 90, are formed on the clutch member 98, so that shifting the member 90 forwardly effects an engagement of its splines 94 with the clutch teeth 100, and thereby establishes a positive connection between the sun gear 43a and the transmission case 12a, as long as the pawl 87 is not withdrawn from its engagement with the ratchet indentation 95, via the members 98, engaging teeth 94 with 100, member 90, and pawl 87, whether or not the member 98 is engaged with the member 91.

A groove 107 is formed in the periphery of the member 90 to receive the bifurcated ends of a crank 108, and which latter is secured to a transverse shaft 109 for the actuation of the member 90.

Looking to the front of the transmission, the clutch shaft Cl is seen to have the teeth 39a extended in length, as compared to the teeth 39 as of Fig. 1, and serving as the sun gear teeth for the auxiliary planetary or epicyclic train S. A planet pinion 73 meshes with each the sun drive gear teeth 39a, and the continuation of the internal gear 40a, and is rotatably supported by a carrier 74 which is mounted rotatable on a bushing 75, which latter in turn is splined to the sun teeth 39a of the clutch shaft Cl.

An extension 76 of the planet carrier 74 is internally splined to carry a shiftable clutch or brake member T that is correspondingly externally splined to be rotatable with, but longitudinally shiftable relative to, the carrier 74 and its extension 76. Internal clutch teeth 77 and 78, of different series diameters, are formed in the member T, the teeth 77 to engage the sun teeth 39a, while the teeth 78 to alternately be engaged with stationary teeth 79 that are secured to the front wall 36a of the transmission case 12a.

A groove 80 is formed in the periphery of the member T to receive a shifter pin 82 that is extended operatively through an opening 83 formed therefor in the carrier sleeve 76, and which pin 82 is secured to a shiftable collar 81 that is mounted to slide longitudinally with respect to the periphery of the carrier 76. A groove 84 is formed in the collar 81 to receive the bifurcated ends of a crank 85 which is secured to a transverse control shaft 86.

*Automatic change speed operation of transmission illustrated by Fig. 5*

To preselect this modified form of the disclosed embodiment of the invention for automatic change speed operation, the shiftable clutch member T is positioned as shown and in which the clutch teeth 77 engage the sun teeth 39a operate to lock the planet carrier 74 and in turn the internal gear 40a rotatable with the clutch shaft Cl. This couples the internal gear 40a for input to the planetary gear unit Fl from the power source directly. In turn, an idling speed of the power source effects a rotatively retrograde idling speed of the sun gear 43a and also the impeller 49a of the hydraulic brake unit Gl through the one-way device Hl. Desiring to start the vehicle, the engine is accelerated resulting in the retrograde speed of the impeller 49a being increased to an R. P. M. at which the working fluid in the casing of the unit Gl initiates its braking action on the impeller 49a and in turn through the device Hl to the sun gear 43a. The planetary gear unit Fl thereupon becomes reactance constrained to drive the driven shaft Dl.

At any subsequent time that it is desired to step-up driving speed to the constant normal ratio of the gear function of the planetary unit Fl, the power will be momentarily shut off to obtain a temporary reduction in the speed of the internal gear 40a or clutch or drive shaft Cl relative to the driven shaft Dl, whereupon the member 98 is adapted to reach substantial synchronism with the member 91, and in consequence their engagement effected under the influence of the centrifugal weight 103. This will lock the sun 43a positively to the transmission case 12a through the junctures of the sun shaft 44a with the member 98, the latter engaged with the member 91, the latter splined to the ratchet 90 and the latter engaged by the pawl 87. Thereafter, the hydraulic unit Gl is cut out, the pump impeller 49a being overrun by the sun gear by virtue of the overrunning device Hl.

In the automatic change speed range, the kick-down positive gear ratio of this transmission design is accomplished by supplying the current to the magnet or solenoid U which thereupon is adapted to actuate the pawl 87 out of its engaged position with the ratchet member 90. This enables the centrifugally actuated clutch unit Q to remain engaged while the reactance function is returned to the hydraulic unit Gl.

To automatically reestablish the positive gear ratio, the speed of the engine, and in turn the speed of the internal driving gear element 40a, is temporarily reduced relative to the driven shaft D2, whereupon the ratchet member 90 is caused to reach substantial synchronism with the pawl 87, whereupon the latter is actuated to reengage the ratchet member 90 under the influence of the spring 89, thus reestablishing the positive and faster gear ratio. Shifting the ratchet member 90 forwardly into engagement with the teeth 100 of the member 98 is to permanently establish the positive gear ratio and permanently avoid the reactance function of the hydraulic brake device Gl.

*Reverse gear selection in the transmission illustrated in Fig. 5*

This may be accomplished by shifting the member T into an extreme forward position in which the teeth 77 will be disengaged from the sun drive gear teeth 39a, and instead the teeth 78 engaged with the stationary teeth 79. This locks the planet carrier 74 to the transmission case 12a, with the result that the internal gear 40a is rotated in reverse from clutch shaft Cl and its sun driving gear teeth 39a. The shifter crank 108 is adapted to be actuated in unison with the shifter crank 85, when the latter is actuated to shift the clutch T for reverse selection, so that the ratchet member 90 will become engaged with the member 98 and in turn the sun 43a locked to the transmission case 12a via the pawl 87 to obtain positive reactance for the sun 43a, so as to establish the gear train Fl for reversing function in conjugation with that function in, and under drive from the reverse output of the planetary gear unit S, to drive the driven shaft Dl in reverse.

It will be seen that the multiplicity of independently engageable and disengageable systems of parts Q and R, shown in Fig. 5 are for establishing the positive drive through the planetary gear unit Fl, and to represent compounded brake units in tandem series. The unit Q for normally establishing the gear unit Fl in positive gear and the unit R to kick-down the positive gear to free-wheeling gear under reactance control of the hydraulic brake unit Gl, and the unit R to automatically reestablish the gear unit Fl in positive gear from a kicked-down condition. While the comparable multiplicity of independently engageable and disengageable systems of parts M and N, shown in Fig. 1 are for establishing the positive drive through the gear unit F, represent compounded clutch units in tandem. The unit M for normally automatically establishing the positive drive and the unit N to kick-down the positive drive to free-wheeling gear under reactance control of the hydraulic brake unit G, and the unit N to automatically reestablish the positive drive from a kicked-down condition. The two members of either of the brake units Q and R, as illustrated in Fig. 5, or of either of the clutch units M and N, as illustrated in Fig. 1, preferably adapted to to engage only when operated in substantial synchronism.

Modified form of the automatic change speed unit illustrated in Fig. 9

The internal input gear 40b is disclosed to be driven through the shiftable clutch member E2 of a manually controlled transmission, like that illustrated in Fig. 1, and substantially the same forms of hydraulic unit g2 and one-way device H2 are shown for automatically establishing one-way reactance to the sun 43b, with the centrifugally operable clutch unit M2 carried and compounded in tandem series with a normally spring or yieldingly engaged friction clutch unit N2. The simultaneous functions of units M2 and N2 being required to establish the positive drive directly through the gear unit F2 in the manner of connecting the elements of the latter to rotate as a unit.

A differential in Fig. 9 lies in an annulus ring or engageable thrust bearing block 117 being carried on a sleeve or hub 116 of a cone presser clutch member 113 that is normally energized by a spring 115 to engage an intermediate clutch member 114, which latter in turn is rotatable with the carrier member 61b of the clutch unit M2, and whereby in turn the intermediate clutch cone 113 is normally packed against the bottom pressure cone clutch member 111. An engaging throw-out bearing 118 is provided in the form of an annular ring 118 that is adapted to be optionally thrust rearwardly to force the embodiment of parts 117 and 113 rearwardly to release or to open the clutch unit N2. This form of the clutch unit N2 lends to being disengaged or reengaged under constant torque conditions, and its relation with the positive type of clutch unit M2, still provides for the establishment by the latter of the positive and faster drive upon a temporary reduction in the speed of the drive member relative to the driven member. Otherwise the automatic change speed unit illustrated by Fig. 9, constitutes substantially the same combination and arrangement and gives the same general performance as that illustrated in Fig. 1.

Modified form of the rear change speed unit illustrated in Fig. 10

The centrifugally operable clutch unit M is omitted, and in the place of the kick-down clutch unit N, both as shown in Fig. 1, a normally engaged but optionally disengageable disk type friction clutch unit W is illustrated for normally connecting the elements of the gear unit F3 to rotate as a unit. While the hydraulic unit g3 is retained and is adapted to operate through the overrunning device H3 to establish one-way reactance to the sun 43c, but only in the event the clutch unit W is forced out of engagement. This provides that the normal drive is through the planetary gear unit F3 directly between the clutch member E3 and the driven shaft D3, so that the reduction in the gear unit F3 is optional.

In this modification the sleeve shaft extension of the sun gear 43c carries a clutch disk 124 rotatable therewith. While a bottom pressure clutch plate 120 is secured to the driven shaft D3 through the medium of a back plate 119 which carries rotatable therewith a longitudinally shiftable pressure clutch plate 121. A shell 122 is secured to the embodiment constituted of parts 120 and 119, and a spring 123, compressed between the shell 122 and the presser plate 121, tends to energize the latter to normally clutch pack the disk 124 against the bottom pressure plate 120, with the result that normally the sun gear 43c and the driven shaft D3 are clutched to rotate as a unit in either direction, and incidentally the elements of the gear unit F3 are connected to rotate as a unit.

Clutch release fingers 125 are arranged cooperative with the presser plate 121, so that actuating the throw-out bearing 127 forwardly is adapted to engage and operate the fingers 125 forwardly at their inner ends and in turn retract the presser plate 121 rearwardly whereby to release or open the clutch W. To release the bearing 127 is to allow the clutch W to be immediately spring reengaged.

Modified form of the variable forward speed planetary gear unit and its control as illustrated in Fig. 11

The gear unit F4 is arranged to the rear of the hydraulic brake or automatic working fluid unit g4 that is adapted to establish the reactance to the sun 43d in one direction through the medium of the overrunning device H4, while a normally but yieldingly engaged clutch unit W4 is associated with the shaft portion 44d of the sun 43d in a circumventing relation around the gear unit F4 via a flange 128, a drum 130, a flange 129, and a tubular shaft 131. It is through this continuity of fixedly connected parts 128, 130 and 129 that the reactance effects of the hydraulic brake unit G4 via the overrunning device H4 reach the sun 43d with one-way reactance. And it is through this continuity of fixedly connected parts 131, 129, 130 and 128 that the drive of the clutch unit W4 is rotatable with the sun 43d.

In this form, the presser plate 19d of the master clutch A4 is adapted to serve as the bottom pressure plate for the clutch unit W4, so that the flywheel serves as the base bottom pressure plate for both clutch units W4 and A4. The supplementing parts of this combined two-speed master clutch comprise the second or sub-presser plate 134 for packing the second driven clutch disk 132 against the plate 19d; separate springs 137, compressed between the shell 17d and the second presser plate 134, whereby the second driven disk 132 is normally packed against the plate 19d; and a snap ring 36 inserted internally in a groove therefor that is cut in the lugs 133 that form integral parts of the main presser plate 19d. Whereby to actuate the clutch release fingers 21d is to first retract the sub-presser plate 134 rearwardly into abutment with the ring 136 and to which point the retraction of the plate 134 will have released only the second driven clutch disk 132, thus opening the clutch unit W4 without molesting the engaged clutch unit A4. While to progressively actuate the fingers 21d further is to thereupon cause the first presser plate 134, operating through its abutment with the ring 136, to take the presser plate 19d rearwardly and thereby also release the first driven clutch disk 16d. This combined multi-master clutch system in the engine flywheel is therefore normally completely engaged and optionally two-stage progressively disengageable with respect to the separate clutching units W4 and A4. As in the form illustrated in Fig. 10, this form illustrated in Fig. 11 normally establishes the positive drive through the planetary gear unit F4, but directly in association with the flywheel, which infers that a manually controlled change speed unit like that illustrated at the front in Figs. 1 and 5, would be positioned at the rear of the planetary gear unit F4.

Thus it will be seen that I have provided a flexible change speed power transmission and control means therefor whose fundamental coordinate is capable of a wide range of variance with respect to detail construction and arrangements and carrying the numerous improved features of the invention.

It will be understood that the invention will yield to a still wider range of variance with respect to change in the forms and arrangement and combinations of detail in the different quarters of the general construction than those illustrated.

I claim:

1. In a power transmission, the combination: of a drive shaft; a driven shaft; transmission mechanism including a planetary gear set for connecting said drive shaft to said driven shaft, said planetary gear set including an internal input gear element and a sun reaction gear element and an output planet carrier driving said driven shaft and whose carried planet pinion is meshed with each said sun and sun gears, said transmission mechanism including a manually controlled selective gear unit disposed drivingly ahead of said planetary gear set and shift selectively establishable to drive said driven shaft either through said planetary gear set or independently of the latter; a spring normally engaged but optionally disengageable master friction clutch associated with said drive shaft and normally establishing the drive between the latter and input to said manually controlled selective gear unit; a stationary member; and reactance means between said sun gear and said stationary member including a turbine ring type hydraulic device for establishing said reactance including a pump impeller element connected to be rotated from said sun gear at least in a retrograde direction with said sun relative to forward rotation of said internal input gear element, and means for resisting turning of said impeller operating against said stationary member at least in said retrograde direction including a stator element of said turbine ring type hydraulic device.

2. The mechanism set forth in claim 1, wherein said manually controlled selective gear unit includes means shiftable into one selection to establish the drive aforesaid between said selective gear unit and said driven shaft drivingly through said planetary gear set, said means shiftable out of said one selection and selectively into one of two other positions respectively to establish two-way forward reduction gear, or two-way reversing gear through said selective gear unit to said driven shaft independent of said planetary gear unit and to incidentally establish the latter in neutral, and whereby in either said selected forward or reversing gear drives through said selective gear unit, and conditionally upon said master clutch being left engaged, two-way gear drive will be in effect between said drive and driven shafts whether or not either of said shafts are at rest or rotating.

3. The mechanism set forth in claim 1, wherein said pump impeller and stator elements form a casing in which a working fluid circulates under the centrifugal impetus of the fluid moving, and wherein the annular passage of the impeller terminates as an annulus rejecting area for its full circumference, together with a cylindrical member operable as a valve axially movable to close and to open said full circumference of the annulus rejecting area of the impeller element, and means for automatically actuating said valve axially in opposite directions respectively to close and to open said annulus rejecting area of the impeller, whereby said impeller rotating below a predetermined speed said valve will occupy a closed position and whereby said impeller being accelerated above said predetermined speed of rotation said valve will be opened gradually in accordance with the increasing speed of the impeller.

4. The mechanism set forth in claim 1, and wherein said connection which is adapted to rotate said impeller of the hydraulic brake device from said sun includes an overrunning device whereby the entire complement of said hydraulic brake device is enabled to come to rest conditionally upon said sun reaction gear element rotating forwardly.

5. The mechanism set forth in claim 1, and wherein said connection which is adapted to rotate said impeller of the hydraulic brake device from said sun reaction gear includes an overrunning device whereby said sun is facilitated to rotate forwardly so as to overrun said impeller and the entire complement of said hydraulic brake device, together with means for automatically establishing at least a division of said planetary gear set including said sun reaction gear element a wholly revolving forward rotating unit that is operable when certain conditions are attained in the mechanism.

6. The mechanism set forth in claim 1, together with an overrunning device in series in the brake train including said hydraulic brake device whereby the retrograde brake acting connections on said sun reaction gear through said hydraulic brake device are complemented to permit said sun gear to rotate forwardly overrunning out of brake restraint; an automatic speed responsive clutch mechanism to establish the elements of at least a division of said planetary gear set including said sun reaction gear element connected to rotate forwardly as a wholly revolving unit operable upon a temporary reduction in the speed of said drive shaft relative to said driven shaft; and a system of engageable and disengageable parts whose engaged condition depended upon by said automatic speed responsive clutch to effect said connection of said elements of said planetary gear set to rotate aforesaid as a wholly revolving unit, said parts adapted engageable only when operated in substantial synchronism, with means continuously but yieldingly urging the engaging element of said parts into an engaged position, and means employable at the option of the operator operable to actuate said engaging element of said parts out of said engaged position, all whereby, subsequent to establishment of said elements of said planetary gear set to rotate aforesaid as a wholly revolving unit, disengaging of said parts to abnormally return said elements of said planetary gear set to a condition for gear function in connection with said hydraulic brake device over said automatic speed responsive clutch retained engaged, and forming mechanism, from an abnormally obtained return of said elements of said planetary gear set to a condition for gear function in connection with said hydraulic brake device aforesaid retaining said automatic speed responsive clutch engaged, to automatically reestablish said elements of said planetary gear set connected to rotate as said wholly revolving unit by reengagement of said parts, and to that end the latter forming parts adapted to engage only when operated in substantial synchronism so that their reengagement is attainable upon a temporary reduction in the speed of the drive shaft relative to the driven shaft.

7. In a power transmission, the combination: of a drive shaft; a driven shaft; a speed-reducing torque-multiplying gear train; a one-way device in series with said gear train to free-wheel the latter; a turbine ring type hydraulic device whose working fluid connection is adapted to establish the drive between said drive and driven shaft drivingly through said gear train for reducing the speed and multiplying the torque; and a pair of positive type clutches compounded in tandem series, the engaging member of one of said pair being urged into an engaged position and provided with means employable at the option of the operator and operable to actuate said member out of said engaged position, the engaging member of the other of said pair being spring urged out of an engaged position and centrifugally operative into said engaged position, the two clutch members of either of said pair adapted to engage only when operated in substantial synchronism, either one or both of said pair of clutches being operable at a time upon a temporary reduction in the speed of the drive shaft relative to the driven shaft to attain said substantial synchronism of said clutch members, and the compound connections of said pair of clutches being adapted to establish the drive between said shafts directly.

8. In a mechanism for coupling a drive shaft to a driven shaft in either of different speed ratios of drive, the combination: of an operating fluid connection to establish a ratio of drive between said shafts indirectly; a subsequently operable automatic clutch unit to establish a faster speed ratio of drive between said shafts, said clutch unit having two clutch members adapted to engage only when operated in substantial synchronism; another clutch unit whose clutching function is depended upon by said faster speed establishing clutch unit to accomplish said establishment, the two clutch members of said other clutch unit adapted to engage only when operated in substantial synchronism; means normally yieldingly urging the engaging member of said other clutch unit into an engaged position; means employable at the option of the operator operable to actuate said engaging member of said other clutch unit out of said engaged position; and means including an overrunning device for enabling, upon a temporary reduction in the speed of the drive shaft relative to the driven shaft, the establishment of substantial synchronism between the two clutch members of either one, or both, of said two-named clutch units at a time.

9. In a power transmission mechanism, in combination, a reduction epicyclic gear train having an internal input gear element and a sun reaction gear element and an output planet carrier whose carried planet pinion is meshed with each said sun and internal gears, a pair of independently engageable and disengageable clutch units compounded in series so that either one coming into an engaged condition cumulatively over an engaged condition of the other is adapted to establish the elements of said gear train to rotate as a unit, the two clutch members of either of said pair of clutch units adapted to engage only when operated in substantial synchronism, means yieldingly urging the engaging member of one of said pair of clutch units into an engaged position, means yieldingly urging the engaging member of the other of said pair of clutch units into a disengaged position, means operable when certain conditions are attained in the mechanism to cause said engaging clutch member of said other clutch unit to be automatically moved into an engaged position, and means under control of the operator operable to actuate said engaging member of said one clutch unit out of said engaged position.

10. In a mechanism including planetary gearing to couple a drive member to drive a driven member in either of different speed ratios, the combination: of means providing an operating fluid connection to complete the connections for reactance to establish gear function in said planetary gearing operable upon sufficient speed of reaction rotation being imparted thereto to establish the drive between said drive and driven members in the first speed ratio, said reactance connections including an overrunning device permitting reduction in the speed of the drive member relative to the driven member; an automatic speed responsive clutch mechanism adapted to establish a faster speed ratio between said drive and driven members operable upon a temporary reduction in the speed of the drive member relative to the driven member; and means under control of the operator operable to kick-down said faster speed ratio at will and forming automatic means to reestablish said faster speed ratio operable upon a repeated temporary reduction in the speed of the drive member relative to the driven member.

11. In a power transmission, the combination: of an internal drive gear; a sun reaction gear; an output planet carrier whose carried planet pinion is meshed with each said sun and internal gears; a reactance train for said sun gear including a mechanical one-way reactance connection and an operating fluid connection in tandem therewith adapted to cause said operating fluid connection to complete the reactance connections through the medium of said one-way device for said sun gear in one direction while permitting overrunning of at least a section of said reactance train with said sun gear in the other direction so that said operating fluid connection is without complementary connections to restrain said overrunning, a clutch unit to establish said elements of the planetary gear unit to rotate as a unit, means to cause said clutch unit normally to be rendered inoperative, and means for automatically accomplishing clutching action on the part of said clutch unit operable when certain conditions are attained in the mechanism.

12. The mechanism set forth in claim 11, together with a second clutch unit having two clutch members adapted to engage only when operated in substantial synchronism, means yieldingly urging the engaging member of said second clutch unit into an engaged position, means employable at the option of the operator operable to actuate said engaging member of said second clutch out of said engaged condition, said second clutch unit being compounded with said first clutch unit whereby the latter depends upon an engaged condition of said second clutch to establish said elements of the planetary gear unit to rotate as a unit.

13. The mechanism set forth in claim 11, together with a second clutch unit compounded with said first clutch unit whereby the latter depends upon an engaged condition of said second clutch unit to establish said elements of the planetary gear unit to rotate as a unit, and alternately operating means under control of the operator adapted to accomplish disengagement and engagement of said second clutch unit.

14. In a mechanism for coupling a drive shaft to drive a driven shaft in either of different speed ratios, the combination: of a turbine ring type hydraulic means providing an operating fluid connection having a pump impeller element connected to be rotated from said drive member and forming means for automatically establishing a slow speed ratio between said drive and driven members when said impeller is rotated at sufficient speed; and means including a normally but yieldingly engaged first system of engageable and disengageable members and a normally but yieldingly disengaged second system of engageable and disengageable members forming two systems of engageable and disengageable members complementing said mechanism whereby their concurrent engagements are required to establish a given faster speed ratio of drive between said drive and driven members so as to eliminate said operating fluid connection from the elements contributing to establishment of said faster speed ratio, the first system of said engageable and disengageable members forming means adapted to disestablish said faster speed ratio and establish a slower speed ratio in dependency upon cooperation of said operating fluid connection; means for automatically actuating the engaging member of said second system of members into an engaged condition operable when certain conditions are attained in the mechanism; and means employable at the option of the operator operable to actuate the engaging member of said first system of members out of an engaged position.

15. The mechanism set forth in claim 14, wherein said first system of engageable and disengageable members are adapted to engage only when operated in substantial synchronism; means to insure a disengaged condition of said first system of members by preventing substantial synchronism therebetween as long as the torque is maintained driving the load through said mechanism; means including an overrunning device in series in said mechanism for permitting a reduction in the speed of the drive shaft relative to the driven shaft in spite of an engaged condition of said second system of members, and the last said means operable upon a temporary reduction in the speed of the drive shaft relative to the driven shaft to bring said first system of members into said substantial synchronism.

16. In a mechanism for coupling a drive shaft to drive a driven shaft, in combination, a planetary gear train having an internal drive gear element driven from said drive shaft and a sun reaction gear element and an output planet carrier driving said driven shaft and whose carried planet pinion is meshed with each said sun and internal gears, a turbine ring type hydraulic brake comprised of a bladed pump impeller and a bladed stationary member and said impeller being connected to be rotated with said sun gear at least when the latter is rotated retrograde relative to forward rotation of said internal gear, said combination forming transmission mechanism between said drive and driven shafts wherein the sole function of the turbine hydraulic device is to complete the connections for preventing said sun gear rotating at least retrograde beyond a certain speed under conditions of a given torque-value manifesting in said sun gear.

17. The mechanism set forth in claim 16, together with a centrifugally operated valve of cylindrical form coaxial with, and movable into and out of one position in which said cylinder encompasses and closes the entire exepelling circumference of the annular fluid passage of said pump impeller, means automatic to retract said valve into said one position coincident with said impeller rotating below a predetermined speed, and the centrifugal operating means for said valve being adapted to actuate said valve out of said one position to open said expelling circumference of the annular fluid passage of said pump impeller gradually in accordance with increasing speed of rotation of said impeller above said predetermined speed.

18. In a power transmission, the combination: of a drive shaft; a driven shaft; variable change speed transmission mechanism for coupling said drive shaft to drive said driven shaft including mechanical speed altering gearing, a turbine ring type hydraulic device to establish the initial drive between said shafts in a slow speed ratio indirectly through gear function in said mechanical gearing, said device including a pump impeller element connected to be rotated from said drive shaft and means complementing the annular passage of said impeller to form a casing for the working fluid of said device to attain an operating circuit of circulation under centrifugal impetus received by said fluid in said impeller, valve means having a cylindrical form coaxial with, and longitudinally reciprocal into and out of a position in which said cylindrical form will encompass and close substantially the full circumference of the annular fluid passage of said impeller element at least at a given rejecting diameter of its vaned portion, means for actuating said valve means into and out of said encompassing position, a clutch adapted to establish a faster speed ratio of drive between said shafts, and means for actuating said clutch either into or out of engaged condition.

19. In a power transmission, the combination: of a drive shaft; a driven shaft; automatically variable change speed transmission mechanism for coupling said drive shaft to drive said driven shaft including a planetary gear unit having a sun gear element and an internal gear element and an output planet carrier directly driving said driven shaft and whose carried planet pinion is meshed with each said sun and internal gears, a turbine ring type hydraulic device including a pump impeller element in 1 to 1 cooperative connected rotatable relation with said sun gear, and said pump impeller being connected to be rotated from said drive shaft whereby the working fluid of said device when of sufficient momentum is adapted to establish the initial drive between said drive and driven shafts drivingly solely through said planetary gear unit with respect to the final drive to said driven shaft so as to obtain torque-multiplying gear function in said gear unit, a speed responsively controlled valve means having a cylindrical form coaxial with, and axially movable into and out of a position in which said cylindrical valve encompasses and closes the entire working fluid rejecting circumference of the annular passage of said pump impeller at least at a given diameter of the latter's vaned portion, a subsequently operable automatic clutch adapted to establish a faster speed ratio of drive between said shafts and to establish the elements of said planetary gear unit to rotate as a unit, and means operable to subsequently establish a slower speed ratio of drive between said shafts while said faster speed establishing clutch is retained in engaged condition.

20. The combination with a planetary gear set including a reaction element; of a stationary member; and normally open but speed responsive automatically establishable reactance between said reaction element and said stationary member including a cam and roller one-way brake connection and an operating fluid brake connection compounded with said cam and roller one-way brake connection such that said reaction element of said planetary gearing is enabled to free-wheel in one direction without restraint from said stationary member and such that the sole function of either said one-way brake or said operating fluid connections is to establish reactance to mechanical gear function in said gear set.

21. The mechanism set forth in claim 20, together with an input power train to said planetary gearing; an output power train from said planetary gearing; and an automatic clutch adapted to establish a faster speed ratio of drive through said planetary gearing between said input and output trains than results when said reactance is established through said one-way and said operating fluid brake connections, said one-way brake connection forming means permitting establishment of said faster speed ratio of drive.

22. In a power transmission, in combination, a drive shaft, a driven shaft, mechanism for coupling said drive shaft to drive said driven shaft in either of different speed ratios including a planetary gear unit having a sun gear element and an internal gear element and an output planet carrier, said carrier being adapted to drive said driven shaft and having a planet pinion meshed with each said sun and internal gears, a turbine ring type hydraulic device having a centrifugally operable cylindrically-shaped single valve adapted to cover and uncover the fluid rejecting circumference of the annular passage of the pump impeller element of said hydraulic device, said valve being operable when one of the members of the mechanism associated with the drive from said drive shaft to said hydraulic device has attained sufficient speed, the operating connection afforded by the working fluid in said device cooperating primarily with the sun gear element of said planetary gear unit so as to establish the drive between said drive and driven shafts through torque-multiplying gear function solely in planetary gearing between said shafts, and subsequently operable clutch mechanism in series in power transmitting relation from said drive shaft to a member of said planetary gear unit and the latter's output planet carrier, one of the members of said clutch being rotatable with said internal gear, said clutch mechanism being adapted to establish a faster speed ratio of drive between said drive and driven shafts by establishing the elements of said planetary gear unit as a wholly revolving unit, said clutch mechanism being operable only when certain conditions are attained in the mechanism.

23. In a power transmission, in combination, a drive shaft, a driven shaft, an epicyclic gear train having a sun gear element and an internal gear element and an output planet carrier rotatable with said driven shaft, said carrier having a planet pinion meshed with each said sun and internal gears, a turbine ring type hydraulic coupling having a pump impeller element and a second complementary element which together form a chamber for the working fluid circuit, said second element being adapted to take the working fluid rejected from and to recurrently return same to said pump impeller element, one of the two said elements of the hydraulic coupling being rotatable at least in one direction with the sun gear element of said epicyclic train, means connected with the other of the two said elements of the hydraulic coupling such that the working fluid connection of the latter is adapted to establish the drive between said drive and driven shafts drivingly through and to obtain speed reduction torque-multiplying gear function in said epicyclic gear train, and a subsequently operable speed responsively controlled clutch mechanism in input power relation to an element of said epicyclic train and its planet carrier, one of the clutch members of said mechanism being rotatable with said internal gear, said clutch mechanism being adapted to establish a faster speed ratio of drive between said drive and driven shafts so as to short-circuit the driving connection established in said epicyclic train by the operating fluid connection of said hydraulic coupling.

24. In a mechanism for coupling a drive shaft to drive a driven shaft including a turbine ring type hydraulic device including a pump impeller element and a working fluid adapted to establish the drive between said shafts at least as to one continuity of driving connections therebetween, in combination, a mechanical overrunning device in series in the drive to said pump impeller so that the latter is connected to be rotated in one direction from said drive shaft while otherwise subsequently completable driving connections between said shafts are enabled to overrun the connection to said hydraulic device including its pump impeller element under certain conditions.

25. In a power transmission, in combination, a drive member, a driven member for propelling the load to be driven, transmission mechanism connecting said drive and said load members including speed reducing and torque-multiplying mechanical type gearing, a tandem connected mechanical overrunning device and an operating fluid connection so arranged that one directly drives the other and the compounded functions of which are adapted to establish a speed reducing and torque-multiplying drive in said mechanical type gearing to connect said drive and load members, and an automatic clutch mechanism adapted to establish a faster speed ratio of drive between said drive and load members through said mechanical gearing, said clutch mechanism being operable upon a temporary reduction in the speed of the drive member relative to the driven member whether the drive member is rotating at low or high speed.

26. In a power transmission, in combination, a planetary gear set including an internal input gear element and a sun reaction gear element and an output planet carrier having a planet pinion meshed with each said sun and internal gears, a normally but yieldingly engaged first clutch unit provided with means for disengaging same at will, a normally but yielding disengaged second clutch unit provided with means to automatically actuate same into an engaged condition operable under certain conditions, said first and second clutch units being connected in series so that their joint engagements are required to establish said gear elements to rotate as a unit with said output planet carrier, and means including an operating fluid connection for giving reactance to said sun gear when the latter rotates at sufficient speed, the last said means to give said reactance as an alternate to said first and second clutch units being concurrently engaged.

27. In a power transmission, in combination, a planetary gear unit having an internal input gear element and a sun reaction gear element and an output planet carrier having a planet pinion meshed with each said sun and internal gears, a driven shaft adapted to be coupled to the load to be driven, said driven shaft being driven immediately from said output planet carrier, means for giving reactance to said sun gear including a turbine ring type hydraulic brake coupling unit, said hydraulic coupling including a pump impeller connected to rotate at least retrograde with said sun gear relative to forward rotation of said internal gear or planet carrier, and a stator element, and said hydraulic coupling unit being entirely independent of said driven shaft save for the connections established via said sun gear and the planet pinion meshed with the latter and said planet carrier, whereby said driven shaft is free to rotate in either direction relative to any element of said hydraulic coupling at least as long as the elements of said planetary gear unit are left non-static.

28. In a power transmission mechanism, in combination, a drive member, a driven member, three independently engageable and disengageable clutch units compounded in tandem series to establish the drive between said drive and driven members, the first of said clutch units being engageable and disengageable at will, another of said clutch units being automatically operable when certain conditions are attained in the mechanism, the third of said clutch units being normally yieldingly automatically engageable only when its two clutch members are operated in substantial synchronism, said third clutch being provided with means employable by the operator to effect its disengagement at will, said third clutch unit being adapted to kickdown the drive established by the concurrent operations of said three clutch units while leaving the other two clutch units in an engaged condition, said third clutch unit being adapted to automatically reestablish said kicked-down drive upon a temporary reduction in the speed of the drive member relative to the driven member, and said first clutch unit being adapted for disengagement at will to establish the transmission between said drive and driven members in neutral in spite of an engaged condition of both said other and said third clutch units.

29. In a power transmission, in combination, a drive shaft, a driven shaft, a slow speed gear train connected to be driven from the drive shaft and having a free-wheeling gear element, an operating fluid connection having a pump impeller element driven in one direction by said free-wheeling gear element, said operating fluid connection being adapted to establish the drive between said drive and driven shafts at said slow speed ratio drivingly through the gear function of said gear train, said operating fluid connection being enabled by said free-wheeling gear element to be overrun upon the succeeding establishment of the drive between said shafts directly, and means for establishing the drive between said shafts directly for accomplishing a two-way drive therebetween alternatively to establishment of the drive through gear function in said gear train.

30. In a power transmission, in combination, a stationary member including a case housing variable speed means of said transmission comprising planetary gearing including an orbital element adapted to be given reactance contributary to rendering said gearing gear functional to transmit the power and torque input thereto to the load to be driven, a turbine ring type hydraulic connecting device adapted for completing the connections to give reactance between said stationary member and said orbital element, said hydraulic connecting device being comprised of a pump impeller element connected to be rotated by said orbital element at least in one direction and a vaned stator element through which the operating fluid passes in completing a circuit that includes passage through said pump impeller, said stator forming substantially the full rear annular passage of a casing complemented at the front by said pump impeller so that the two are adapted to contain the operating fluid which is adapted to give the hydraulic brake connection, and said stator element forming a portion of the rear wall of said case for housing mechanism of said transmission, and said stator arranged to reject the fluid circuit flow therethrough immediately recurrently to the pump impeller element.

31. In a power transmission, in combination, a drive shaft, a clutch shaft in axial alignment with said drive shaft, master clutching means automaticly engageable but disengageable at will, said clutching means operable directly between said drive and clutch shafts, a driven shaft in axial alignment with said clutch shaft, automatic variable change speed transmission mechanism encircling said driven shaft and related to drive the latter, said automatic variable transmission mechanism including an independently rotatable primary input member concentrically encompassing said driven shaft, means for selectively establishing either said primary input member of said automatic variable transmission mechanism rotatable with said clutch shaft, or alternately said primary input member of said automatic variable transmission mechanism disconnected from said clutch shaft and in the stead either said clutch shaft in neutral with respect to both said driven shaft and said primary input member of said automatic variable transmission, or said clutch shaft in either forward or reversing gear drive connection with said driven shaft and in either of said alternates independent of said automatic variable ratio transmission mechanism, and an operating fluid connection whose pump impeller element establishable to be rotated from said drive shaft incidental to said means positioned to establish the primary input member of said automatic variable transmission mechanism rotatable with said clutch shaft, said operating fluid connection for establishing the first ratio of drive through said automatic variable transmission mechanism between its said primary input member and said driven shaft operable when rotated at sufficient speed whereby, over a condition of said master clutch being engaged and said primary input member of said automatic variable transmission mechanism being established rotatable with said clutch shaft, said automatic variable transmission mechanism is initially no-drive until the driving train input thereto is operated at sufficient rotation to secure said sufficient rotation of said operating fluid connection.

32. In a motor vehicle drive, in combination with the vehicle engine crankshaft and the flywheel rotatable therewith, and a driven shaft for propelling the vehicle: a mechanical change speed transmission mechanism drive operatively associated between said shafts; a spring normally engaged master friction clutch having a driven element engageable with said flywheel and under control of the operator to be disengaged at will; a turbine ring type hydraulic device having a working fluid adapted for establishing the initial drive between said master friction clutch and said driven shaft drivingly through certain connections of said change speed transmission mechanism, and means in said change speed transmission mechanism selectively shiftable into one position to set up said certain connections to be drivingly established between said master friction clutch and said driven shaft by the working fluid of said hydraulic device, and shiftable out of said one position and into either a no-drive position or into a third position in which the elements of said change speed transmission mechanism are set up for giving a positive and fixed ratio under-gear-drive connection between said master friction clutch and said driven shaft wholly independent of said hydraulic device, whereby in said fixed ratio of under-gear-drive the engine compression is utilizable as a brake against rotation of said driven shaft in either direction whether the engine and the drive are at complete rest or in motion.

33. In a motor vehicle drive, in combination with the engine crank shaft and a driven shaft for propelling the vehicle: a change speed transmission mechanism drive operative between said shafts including an operating fluid connection to establish the initial drive between said shafts, means in said change speed transmission under control of the operator and operable selectively so as to set up said transmission mechanism so that the drive therethrough between said shafts will be established by said operating fluid connection or to set up said transmission mechanism so as to give either a two-way drive under-gear forward drive ratio, or a two-way direct drive forward speed, between said shafts and both of the last said drives being adapted to be completed independently of said operating fluid connection.

34. In a motor vehicle drive, in combination with the engine crank shaft and a driven shaft for propelling the vehicle: a change speed transmission mechanism drive operatively associated between said shafts including means under control of the operator to set up said transmission mechanism either for the drive to be initially established between said shafts by and including an operating fluid connection, or alternatively to set up said mechanism for giving a forward speed two-way under-gear drive connecting said shafts so that one is rotatable from the other whether either is at rest or in motion, or for giving a reversing gear two-way drive connecting said shafts whether either is at rest or in motion, and such that either said forward or said reversing two-way gear drives between said shafts are wholly independent of said operating fluid connection.

35. In a motor vehicle drive, in combination with the vehicle engine crank shaft and flywheel rotatable therewith, and a driven shaft for propelling the vehicle: of change speed transmission mechanism drive operatively between said flywheel and driven shaft including a spring engaged master friction clutch whose driven friction clutch element engages said flywheel and disengages at will, and an operating fluid connection connected to be driven from said master friction clutch, said change speed transmission mechanism being shift selective, into one position establishing the mechanism for automatic change speed transmission operation thereafter between said master clutch and driven shaft and wherein said operating fluid connection to establish the initial drive of said automatic change speed range between said master clutch and the driven shaft drives through a division of said change speed transmission, said change speed transmission mechanism being alternatively shift selective into one or four other positions in either of which four other positions it disestablishes the automatic change speed range of operation and also said operating fluid connection from cooperating in establishing the drive but in dependency upon the function of said master clutch, in one of said four other positions to establish the transmission no-drive, i. e. in neutral, in a second of said other positions to establish the transmission in a slow speed two-way drive operative forward speed ratio, in a third of said other positions to establish the transmission in a faster speed two-way drive operative forward ratio, and in the fourth of said other positions to establish the transmission in a two-way drive operative reversing gear, in either of said second, third and fourth positions whereby the respective drive is operable between said shafts whether either of the latter is at rest or in motion providing said master clutch is not disengaged.

36. In a power transmission, in combination, a pair of coaxial revolvable power transmitting members, a pair of clutch units connected in tandem the driven clutch member of the first clutch rotatable with the driving clutch member of the second clutch of said pair, the driving clutch member of the said first clutch rotatable with the driving one of said pair of power transmitting members, the driven clutch member of the said second clutch rotatable with the driven one of said pair of power transmitting members, the two clutch members of either of said pair of clutches adapted to engage only when operated in substantial synchronism, means yieldingly tending to urge the engaging member of one of said clutches into an engaged position, means yieldingly tending to urge the engaging clutch member of the other of said clutches out of an engaged position, said engaging clutch member having the yielding means aforesaid tending to urge same out of an engaged position being centrifugally operable into its engaged position, and means under control of the operator whereby to actuate said engaging member of the clutch having the yielding means aforesaid tending to urge same into its engaged position out of said engaged position at will, the centrifugally operable engaging clutch member carried rotatable with the driven clutch member of the driving one of said pair of clutch members.

37. In a power transmission, in combination, a planetary gear unit constituted of an internal input gear element and a sun reaction gear element and an output planet carrier having a carried planet pinion meshed with each said sun and internal gears, reactance means automatically establishable to restrain said sun gear from rotating retrograde relative to opposite direction of rotation of said internal gear, said reactance means including an overrunning device permitting said sun gear to rotate in the other direction, an automatically operable clutch to establish the elements of said planetary gear unit connected to rotate as a unit, said clutch being operable upon a temporary reduction in the speed of said internal input gear relative to said output planet carrier, a second clutch compounded with said first clutch so that the latter is in dependency upon an engaged condition of said second clutch for establishment of elements of said planetary gear unit to rotate as a unit, and means for obtaining engagement or disengagement of said second clutch at will.

38. In a power transmission, coaxial drive, intermediate and driven power transmitting members, two positive type movable clutch members, said intermediate member carrying one of said movable clutch members so that said clutch member is rotatable therewith but shiftable relative thereto, one of the other of said members having a clutch portion adapted to be engaged by the clutch member carried by said intermediate member, the third of said members carrying the other of said movable clutch members rotatable therewith but shiftable relative thereto, said intermediate member having a clutch portion adapted to be engaged by the clutch member carried by the third of said driving and driven members.

39. In a change speed power transmitting mechanism, first, second and third coaxial power transmitting members adapted to be connected in series, a first shiftable jaw clutch adapted for connecting said first and second power transmitting members, a second shiftable jaw clutch member adapted for connecting said second and third power transmitting members, a free-wheeling reduction gear train adapted initially to participate in the drive between said first and one or the other of said second or third power transmitting members, said first and second shiftable clutches being arranged so that the combined connections established by their simultaneous engaged conditions are required to establish a direct drive between the first and third power transmitting members, movable shifter means connected with one of said clutches for effecting engagement and disengagement of its clutch, and spring means resiliently urging said shifter member in one direction to cause engagement of the last said clutch when the driving and driven members of said clutch are in substantial synchronization.

40. In a motor vehicle drive, in combination with the crankshaft of the vehicle engine, a driven shaft for propelling the vehicle, transmission mechanism and control means therefor for connecting said crankshaft and driven shaft including a friction type master clutch and a turbine ring type hydraulic coupling and an automatic clutch, said automatic clutch being adapted to establish a faster speed ratio between said crankshaft and driven shaft when engaged, said automatic clutch being adapted to engage only when its clutch members are operated in substantial synchronism, said clutch being adapted to be actuated into an engaged condition during a temporary reduction in the speed of the engine crankshaft relative to said driven shaft, and a second clutch adapted normally to be engaged and adapted to be disengaged at will, said second clutch when in its disengaged state forming clutch means adapted to become automatically reengaged during a temporary reduction in the speed of said crankshaft relative to said driven shaft, said second clutch being arranged so that upon disengagement to disestablish a train of drive connections and to retrieve drivingly a slower speed driving ratio connection between said crankshaft and driven shaft without disengaging either said master clutch or the said automatic clutch.

41. A change speed transmission for coupling the engine crankshaft to the propeller shaft of a motor vehicle drive, a turbine ring type hydraulic coupling adapted for establishing an initial drive between the crankshaft and propeller shaft automatically at a speed reducing gear ratio, a clutch having clutch members adapted to engage only when operated in substantial synchronism for later establishing direct drive between said crankshaft and propeller shaft, said clutch adapted to be automatically engaged incidental to a temporary reduction in the speed of the crankshaft relative to the propeller shaft, a gear train adapted to be manually established to give a fixed ratio so that any tendency of the propeller shaft to rotate in either direction will operate to rotate the crankshaft at a greater speed than said propeller shaft and in the same direction so as to provide an engine compression brake, and a normally but yieldingly engaged friction master clutch adapted for disengagement at the will of the operator, said friction master clutch being adapted when disengaged to disconnect the drive between the crankshaft and the propeller shaft regardless of the engaged condition of either the said hydraulic coupling or the said gear train.

42. The mechanism described in claim 41, wherein means are provided for automatically actuating the engaging member of one of said clutches normally into a disengaged position and said engaging member being adapted to be automatically moved into engaged position when certain conditions are attained in the mechanism, and wherein a slidable engaging member of the other of said two clutches is adapted to be slidable at least in one direction at the will of the operator.

43. In a change speed power transmission and control means therefor, two positive type clutches compounded to establish a given speed ratio of drive between a rotatable drive member and a rotatable driven member, means for automaticaly actuating one of said clutches into and out of engaged condition when different certain conditions are attained in said mechanism control means, and means operative independently of the actuating means for said one clutch to actuate said other clutch into or out of engaged condition at the will of the operator, said other of said two clutches being connected so that its return to a disengaged condition over an engaged condition of said one automatic clutch is adapted to reestablish a speed reducing drive ratio from said drive member to said driven member, and means including another engageable and disengageable positive clutch adapted to contribute to the establishment of a still different speed reducing drive ratio from said drive member to said driven member, the last said ratio drivingly circumventing said compounded clutches.

44. In a power transmission mechanism, in combination, a drive shaft, a driven shaft, means for automatically completing driving connections between said drive and driven shafts initially to rotate said driven shaft at a torque-multiplying speed reduction ratio relative to said drive shaft comprising a turbine ring type hydraulic coupling device having a pump impeller member constructed with substantially radially extending vanes arranged throughout substantially the full form of said impeller member, means including a clutch mechanism for automatically establishing a faster speed driving ratio between said drive and driven shafts, said means being operable when certain conditions are attained in the mechanism, a cylindrically-shaped valve adapted when in one position to shut off the annular fluid passage in said pump impeller member so that circulation of the fluid under centrifugal influence in said impeller member will be reduced sufficiently to render torque transmission through said coupling substantially nil, said valve when in another position being adapted to open the annular passage of the impeller member to permit substantially unrestrained radial movement of the fluid under centrifugal influence, and means for actuating said valve axially either into said one position or out of said one position and into said other position.

45. In a power transmission, a drive shaft, a driven shaft, means for establishing a torque-multiplying speed reducing connection from the drive shaft to the driven shaft, said means including a friction type master clutch adapted for disengagement at the will of the operator and a turbine ring type hydraulic device connected to be driven from said drive shaft through an engaged condition of said master clutch, and means for establishing a positive two-way drive operative connection between said drive and said driven shafts so as to rotate said driven shaft at reduced speed and at multiplied torque relative to said drive shaft, the last said means including the same engaged relation of said master clutch as is depended upon for the drive from said drive shaft to said turbine ring type hydraulic device but excluding said coupling.

EVERETT R. BURTNETT.